United States Patent
Adelmann et al.

(10) Patent No.: US 8,569,199 B2
(45) Date of Patent: Oct. 29, 2013

(54) VANADIUM-FREE CATALYST FOR SELECTIVE CATALYTIC REDUCTION AND PROCESS FOR IT'S PREPARATION

(75) Inventors: Katja Adelmann, Rodenbach (DE); Nicola Soeger, Frankfurt am Main (DE); Lothar Mussmann, Offenbach (DE); Marcus Pfeifer, Solingen (DE); Gerald Jeske, Neuberg (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 665 days.

(21) Appl. No.: 12/444,312

(22) PCT Filed: Sep. 17, 2007

(86) PCT No.: PCT/EP2007/008068
§ 371 (c)(1),
(2), (4) Date: Oct. 20, 2009

(87) PCT Pub. No.: WO2008/049491
PCT Pub. Date: May 2, 2008

(65) Prior Publication Data
US 2010/0034717 A1    Feb. 11, 2010

(30) Foreign Application Priority Data
Oct. 23, 2006    (EP) .................... 06022121

(51) Int. Cl.
*B01J 23/10*      (2006.01)
*B01J 23/00*      (2006.01)
*B01D 53/46*      (2006.01)

(52) U.S. Cl.
USPC ............ 502/304; 502/349; 423/210; 423/235

(58) Field of Classification Search
None
See application file for complete search history.

(56) References Cited

U.S. PATENT DOCUMENTS

| | | | |
|---|---|---|---|
| 4,798,817 A | 1/1989 | Becker et al. | |
| 4,961,917 A | 10/1990 | Byrne | |
| 6,150,299 A * | 11/2000 | Umemoto et al. | 502/304 |
| 6,576,207 B1 * | 6/2003 | Mussmann et al. | 423/212 |
| 6,843,971 B2 * | 1/2005 | Schafer-Sindlinger et al. | 423/239.2 |
| 6,914,026 B2 | 7/2005 | Tran et al. | |
| 2005/0282698 A1* | 12/2005 | Southward et al. | 502/34 |
| 2007/0244002 A1* | 10/2007 | Kozlov | 502/304 |
| 2008/0038174 A1* | 2/2008 | Mori et al. | 423/237 |
| 2008/0286184 A1* | 11/2008 | Ando et al. | 423/213.5 |

FOREIGN PATENT DOCUMENTS

| | | |
|---|---|---|
| EP | 0 246 859 A1 | 11/1987 |
| EP | 0 385 164 B1 | 12/1990 |
| EP | 1 147 801 B1 | 10/2001 |
| EP | 1 153 648 A1 | 11/2001 |
| EP | 1 495 804 A1 | 12/2005 |
| EP | 1 685 891 A | 8/2006 |
| EP | 1 736 232 A1 | 12/2006 |
| GB | 2149680 | * 10/1984 |
| JP | 2005-238195 | 8/2005 |
| WO | 2005/082494 | * 9/2005 |
| WO | 2005099873 | * 10/2005 |

OTHER PUBLICATIONS

Perez-Hernandez, R. et al "NO Reduction with CH4 or CO on Pt/ZRO2-CeO2". Catalysis Today 107-108, 175-180 (2005).*
International Search Report issued on corresponding PCT/EP2007/008068 filed on Sep. 17, 2007.
Saidina Amin et al: "SCR of N0 with C3H6 in the presence of excess 02 over Cu/Ag/Ce0s-Zr0s catalyst" Chemical Engineering Journal, Elsevier Sequoia, Lausanne, CH, Bd. 113, Nr. 1, (Oct. 1, 2005).
Thomas et al: "On the promotional effect of Pd on the propene-assisted decomposition of N0 on chlorinated Ce0.68Zr0.3202" Applied Catalysis B: Environmental, Elsevier, Bd. 63, Nr. 3-4 (Mar. 31, 2006).
Thomas et al: "influence of the nature of the noble metal on th elean C3H6-assisted decomposition of No on Ce0.68Zr0.3202-supported catalysts" Journal of Molecular Catalysis. A, Chemical, Elsevier, Amsterdam, NL, Bd. 249, Nr. 1-2 (Apr. 18, 2006).
Perez-Hernandez et al: "N0 reduction with Ch4 or C0 on Pt/Zr02-Ce02 catalysts" Catalysis Today, Elsevier, Bd. 107-108, (Oct. 30, 2005).
International Preliminary Report on Patentability issued on corresponding International Application No. PCT/EP2007/008068.

* cited by examiner

*Primary Examiner* — Melvin C Mayes
*Assistant Examiner* — Sheng H Davis
(74) *Attorney, Agent, or Firm* — Smith, Gambrell & Russell, LLP

(57) ABSTRACT

Selective catalytic reduction with ammonia or a compound that decomposes to ammonia is a known method for the removal of nitrogen oxides from the exhaust gas of primarily lean-burn internal combustion engines. The vanadium-containing SCR catalysts that have long been generally used for this are characterized by a good conversion profile. However, the volatility of vanadium oxide can, at higher exhaust gas temperatures, lead to the emission of toxic vanadium compounds. Zeolite-based SCR catalysts, which are used in particular in discontinuous SCR systems, constitute a very cost-intensive solution for the problem.
A method is proposed by which a homogeneous cerium-zirconium mixed oxide is activated for the SCR reaction in a defined manner by the introduction of sulphur and/or transition metal. Using this method, a highly active, ageing-resistant SCR catalyst is provided, which represents a vanadium-free, cost-effective and high-performance alternative to the existing SCR catalysts and is suitable in particular for use in motor vehicles.

16 Claims, 5 Drawing Sheets

VANADIUM-FREE CATALYST FOR SELECTIVE CATALYTIC REDUCTION AND PROCESS FOR IT'S PREPARATION

This application claims the benefit of International Application PCT/EP2007/008068 filed Sep. 17, 2007 and EP Application 06022121.5 filed Oct. 23, 2006 which are relied on and incorporated herein by reference.

INTRODUCTION AND BACKGROUND

The invention relates to a novel, vanadium-free catalyst for the selective catalytic reduction of nitrogen oxides with ammonia or a compound that decomposes to ammonia as reducing agent, which is especially suitable for removing nitrogen oxides from exhaust gases from primarily lean-burn internal combustion engines in motor vehicles. The invention relates further to a method of activation of a homogeneous cerium-zirconium mixed oxide for the selective catalytic reduction of nitrogen oxides.

The emissions of a motor vehicle can basically be divided into two groups. Thus, the term raw emission denotes pollutant gases that are formed directly in the engine through the fuel combustion process and are already contained in the exhaust gas before passing through the exhaust gas cleaning system. Exhaust gas components that may form as by-products in the exhaust gas cleaning system are termed secondary emissions.

Exhaust gases from motor vehicles with a primarily lean-burn internal combustion engine contain, in addition to the usual primary emissions carbon monoxide CO, hydrocarbons HC and nitrogen oxides NOx, a relatively high oxygen content of up to 15 vol. %. Carbon monoxide and hydrocarbons can easily be made harmless by oxidation. However, reduction of the nitrogen oxides to nitrogen is much more difficult, on account of the high oxygen content.

A known method for the removal of nitrogen oxides from exhaust gases in the presence of oxygen is the method of selective catalytic reduction (SCR process) by means of ammonia on a suitable catalyst, called an SCR catalyst for short. In this method, the nitrogen oxides that are to be removed from the exhaust gas are reacted with ammonia to nitrogen and water. The ammonia that is used as reducing agent can be made available by feeding a compound that decomposes to ammonia, for example urea, ammonium carbamate or ammonium formate, into the exhaust system and subsequent hydrolysis. Furthermore, exhaust gas cleaning concepts for motor vehicles are known in which ammonia is produced as secondary emission on a series-installed catalyst during a rich operating phase of the engine, for example a nitrogen oxide storage catalyst, and is stored temporarily in the SCR catalyst until the time of consumption during the lean operating phases.

Use in a discontinuously operating SCR system, in which the ammonia used as reducing agent is produced exclusively as secondary emission in the exhaust system, requires SCR catalysts with sufficient ammonia storage capacity to provide if at all possible the entire requirement for the reducing agent for removal of nitrogen from the exhaust gas during the lean phase. Zeolite-based SCR catalysts, as described in numerous publications and patent applications, are particularly suitable for this. For example, U.S. Pat. No. 4,961,917 describes a method for reduction of nitrogen oxides with ammonia using a catalyst which, in addition to a zeolite with defined properties, contains iron and/or copper as promoter. Other SCR catalysts based on transition-metal-exchanged zeolites and methods of selective catalytic reduction using said SCR catalysts are described for example in EP 1 495 804 A1, U.S. Pat. No. 6,914,026 B2 or EP 1 147 801 B1.

For use in exhaust gas cleaning systems with metering devices for urea or other compounds that decompose to ammonia, providing continuous supply of reducing agent to the system, it is not necessary for the SCR catalyst to have a large ammonia storage capacity. Accordingly we try to avoid using zeolite-based SCR catalysts, as they are very expensive on account of the high production costs for zeolite compounds.

SCR catalysts that contain vanadium oxide in addition to titanium dioxide or tungsten oxide or mixtures thereof are suitable for this. For example, EP 0 385 164 B1 describes such a catalyst that contains, in addition to titanium dioxide, at least one oxide of tungsten, silicon, boron, aluminium, phosphorus, zirconium, barium, yttrium, lanthanum or cerium, and at least one oxide of vanadium, niobium, molybdenum, iron or copper and that is produced as a moulded article by compaction or extrusion of the components, optionally after adding suitable auxiliary agents. EP 1 153 648 A1 describes a structured SCR catalyst, which contains, beneath a coating of hydrolysis catalyst, a reduction coating whose composition corresponds to the recipe known from EP 0 385 164 B1. EP 0 246 859 describes an SCR catalyst that contains vanadium, applied on a mixture of cerium oxide and aluminium oxide.

An important problem when using vanadium-containing SCR catalysts for cleaning exhaust gases from motor vehicles is the possible emission of volatile, toxic vanadium compounds at higher exhaust gas temperatures, probably with harmful effects on humans and the environment. Accordingly there is low market acceptance of vanadium-containing car exhaust catalysts.

Efforts have already been made since long ago to provide vanadium-free SCR catalysts as a cost-effective alternative to high-priced, zeolite-based systems.

For example, U.S. Pat. No. 4,798,817 describes an SCR catalyst that essentially contains from 0.5 to 50% iron sulphate applied on a mixture of 2 to 60% cerium oxide and aluminium oxide. U.S. Pat. No. 4,780,445 describes an SCR catalyst with 0.1 to 25% nickel sulphate or manganese sulphate or mixtures thereof applied on a mixture of 2 to 60% cerium oxide and aluminium oxide.

JP 2005-238195 or EP 1 736 232 describes a catalyst system for the removal of nitrogen oxides, containing a first reaction section for denitration by reaction of nitrogen oxides with ammonia and a second reaction section for oxidation of excess ammonia, in which the first reaction section contains a first catalyst, which contains as active component at least one complex oxide containing two or more oxides selected from the group comprising silicon oxide, aluminium oxide, titanium oxide, zirconium oxide, and tungsten oxide, and a rare-earth metal or transition metal except Cu, Co, Ni, Mn, Cr and V.

Apostolescu et al. describe, in Appl. Catal. B: Environmental 62 (2006) 104, investigations on SCR powder catalysts of $Fe_2O_3/ZrO_2$ with $WO_3$ doping in synthetic model exhaust gas.

The known vanadium-free and zeolite-free SCR catalysts are sometimes of complicated composition, difficult to manufacture and/or do not satisfy the more stringent requirements on activity and ageing stability for use in motor vehicles.

The problem to be solved by the present invention is therefore to provide an SCR catalyst that is vanadium-free, and can be manufactured more cheaply than zeolite-based systems and with simple means. In comparison with existing known systems the catalyst should have a high catalytic activity and good ageing stability, and it should be suitable in particular for the removal of nitrogen oxides from the exhaust gas of primarily lean-burn internal combustion engines in motor vehicles with a continuous SCR system including a metering device for ammonia or a compound that decomposes to ammonia.

SUMMARY OF THE INVENTION

This problem is solved by a SCR catalyst containing a catalytically active coating on an inert support, with the catalytically active coating comprising, completely or partially, a homogeneous cerium-zirconium mixed oxide, which contains 10 to 90 wt. % cerium oxide based on the total weight of the homogeneous cerium-zirconium mixed oxide and which is activated for the SCR reaction by the introduction of sulphur or a transition metal selected from the group consisting of chromium, molybdenum, tungsten and mixtures thereof or by combinations thereof.

A "homogeneous cerium-zirconium mixed oxide" (shortened to: cerium-zirconium mixed oxide) means, in the sense of this description, an oxidic, solid pulverulent material, comprising at least the two components cerium oxide and zirconium oxide. The components form a mixture at the atomic level. This term excludes physical mixtures of cerium oxide-containing powders with zirconium oxide-containing powders. The composition of said mixed oxides is, within the limits of measurement accuracy, constant over the cross-section of a powder grain, i.e. they are homogeneous. Materials of this kind are sometimes also called "solid solutions" in the literature.

In the untreated state, these cerium-zirconium mixed oxides do not display any significant catalytic activity in the SCR reaction, as is demonstrated by the activity data shown in FIG. 1 for two examples of untreated cerium-zirconium mixed oxides with 86 wt. % cerium oxide (VK1 from Comparative Example 1) or 48 wt. % cerium oxide (VK2 from Comparative Example 2), in each case based on the total weight of the homogeneous cerium-zirconium mixed oxide. The inventors' investigations led to the surprising result that a homogeneous cerium-zirconium oxide, when suitably pretreated, shows better SCR activity than existing SCR catalysts according to the state of the art. Homogeneous cerium-zirconium mixed oxides, treated by one of the methods described below, are meant when discussing, in this description, cerium-zirconium mixed oxide that has been activated for the SCR reaction.

Activation of the cerium-zirconium mixed oxides for the SCR reaction is carried out by the introduction of sulphur or of a transition metal selected from the group consisting of chromium, molybdenum, tungsten and mixtures thereof. The activating components are incorporated in the oxide framework of the cerium-zirconium mixed oxide. Especially advantageous embodiments can be obtained by combining both activating measures. The introduction of sulphur and the introduction of the transition metal take place in separate, successive process steps.

Sulphur can be introduced by treating the cerium-zirconium mixed oxide that is to be activated, with a gas mixture that contains sulphur dioxide $SO_2$ in addition to oxygen. The treatment is carried out at temperatures between 150 and 800° C., preferably between 250 and 650° C., especially preferably between 300 and 400° C. A suitable gas mixture contains, in addition to 0.15 to 15 vol. % oxygen, 5 to 50000 ppm sulphur dioxide, preferably 5 to 500 ppm sulphur dioxide, especially preferably 10 to 100 ppm $SO_2$. The gas mixture can also contain up to 20 vol. % water.

Sulphur can also be introduced by treating the cerium-zirconium mixed oxide with dilute sulphuric acid at room temperature or slightly elevated temperature up to 80° C., followed by drying. Drying can be carried out in air at temperatures between 80 and 150° C.

The amount of sulphur introduced into the activated cerium-zirconium mixed oxide depends on the type and duration of treatment. A cerium-zirconium mixed oxide activated for the SCR reaction contains 0.01 to 5 wt. % sulphur, preferably 0.02 to 3 wt. % sulphur, based on the total weight of the activated cerium-zirconium mixed oxide.

Furthermore, the cerium-zirconium mixed oxide can be activated for the SCR reaction by introducing a transition metal selected from the group comprising chromium, molybdenum, tungsten and mixtures thereof. For this, the cerium-zirconium mixed oxide is impregnated with an aqueous solution of a compound of chromium, molybdenum, tungsten or mixtures thereof, the amount of solution being selected such that the cerium-zirconium mixed oxide powder is moistened so that its pores are filled, but it remains free-flowing. Then the powder is dried in air at 300 to 700° C. for a time from 0.5 to 5 hours, leading to thermal fixation of the transition metal in the cerium-zirconium mixed oxide. The operation is repeated if necessary, until the cerium-zirconium mixed oxide thus produced contains, after drying, 2 to 20 wt. %, preferably 5 to 15 wt. % of chromium, molybdenum, tungsten or mixtures thereof, based on the total weight of the activated cerium-zirconium mixed oxide. The above procedure ensures that the transition metal is distributed in highly dispersed form in the cerium-zirconium oxide. This is a prerequisite for effective activation of the cerium-zirconium mixed oxide.

Ageing-resistant cerium-zirconium mixed oxides with particularly good activation for the SCR reaction are obtained when in addition a transition metal selected from the group consisting of manganese, iron, cobalt, nickel, copper, ruthenium, rhodium, palladium, silver, iridium, platinum or gold or mixtures thereof is used as a promoter. The additional transition metal can be introduced in the same process that was also used for activation with chromium, molybdenum or tungsten. In particular, the transition metals used as promoters can be added to the solution containing chromium, molybdenum, tungsten or mixtures thereof and applied with the activating transition metal in the same process step. The resultant, activated cerium-zirconium mixed oxide preferably has a content of manganese, iron, cobalt, nickel, copper, ruthenium, rhodium, palladium, silver, iridium, platinum or gold or mixtures thereof from 0.1 to 10 wt. %, preferably 0.5 to 5 wt. %, in each case based on the total weight of the activated cerium-zirconium mixed oxide.

Especially preferred embodiments of the activated cerium-zirconium mixed oxide contain 0.02 to 3 wt. % sulphur and/or 5 to 15 wt. % molybdenum or tungsten and 0.5 to 3 wt. % iron or copper, based in each case on its total weight.

The method described is very suitable for the activation of homogeneous cerium-zirconium mixed oxides for the SCR reaction, when the latter contain 10-90 wt. % cerium(IV) oxide, based on the total weight of the homogeneous cerium-zirconium mixed oxide. Use of homogeneous cerium-zirconium mixed oxides with a BET surface area of more than 50 $m^2/g$ and a cerium(IV) oxide content of 40-90 wt. % is preferred, and those with 45-55% $CeO_2$ are especially preferred. The cerium-zirconium mixed oxides used can be doped with rare-earth metals and contain 1 to 9 wt. % rare-earth oxide based on the total weight of the homogeneous cerium-zirconium mixed oxide. Rare-earth oxides of scandium, yttrium, lanthanum, praseodymium, neodymium, samarium, europium, gadolinium or mixtures thereof are especially preferred.

As already mentioned, a combination of the introduction of sulphur and of the introduction of transition metal can lead to especially advantageous embodiments. For this, on the one hand, sulphur can be introduced into a transition metal-containing homogeneous cerium-zirconium mixed oxide by treatment with a gas mixture containing $SO_2$ and oxygen or by treatment with dilute sulphuric acid and subsequent drying. The transition metal contained in the cerium-zirconium mixed oxide can be one selected from the group consisting of chromium, molybdenum, tungsten, manganese, iron, cobalt, nickel, copper, ruthenium, rhodium, palladium, silver, iridium, platinum or gold, or combinations thereof. On the other hand, a transition metal can be introduced, by the method described, in a homogeneous cerium-zirconium mixed oxide that already contains sulphur. The order of the process steps leads to embodiments of the catalyst with different chemical composition. Which order of the process steps leads to the overall more advantageous activation of the cerium-zirconium mixed oxide depends on the homogeneous cerium-zirconium mixed oxide selected as starting material and on the transition metal oxide used for activation. This constitutes a task of optimization for the catalysts that are finally produced from the activated cerium-zirconium mixed oxide, with reference to the particular target application.

If a cerium-zirconium mixed oxide activated in the manner described for the SCR reaction is applied on an inert support, a catalyst is obtained for the selective catalytic reduction of nitrogen oxides with ammonia or a compound that decomposes to ammonia. The support can consist of ceramic or metal. If a ceramic flow-through honeycomb monolith or a ceramic wall-flow filter substrate is used, a SCR catalyst is obtained that is especially suitable for the removal of nitrogen oxides from the exhaust gas of primarily lean-burn internal combustion engines in motor vehicles. The support can be coated completely or only partially with an activated cerium-zirconium mixed oxide. Complete coating of the support is always selected when sufficient installation space is available in the exhaust system of the motor vehicle for which the catalyst is intended, for arranging an additional hydrolysis catalyst on the inflow side and an additional ammonia trapping catalyst on the outflow side. In such an arrangement the purpose of the hydrolysis catalyst is to decompose a compound that decomposes to ammonia, which is fed into the exhaust system, with release of ammonia. The purpose of an ammonia trapping catalyst is to oxidize excess ammonia that passes through the SCR catalyst at certain operating points, to nitrogen, thus preventing its emission to the environment. If there is insufficient installation space, the hydrolysis catalyst can be applied on the coating with activated cerium-zirconium oxide, utilizing the entire length of the support. It is also possible for the coating with the cerium-zirconium mixed oxide according to the invention to be applied to just a portion of the support, whereas in a zoned arrangement of the coating either a hydrolysis catalyst coating can be applied on the inflow side and/or an ammonia trapping catalyst coating and/or another SCR catalyst coating on the outflow side.

SCR catalysts that are produced by complete or partial coating of an inert support with a cerium-zirconium mixed oxide according to the invention, activated for the SCR reaction, comprising a homogeneous cerium-zirconium mixed oxide containing 10 to 90 wt. % cerium oxide, preferably 40 to 90 wt. %, especially preferably 45 to 55 wt. % cerium oxide, in each case based on the total weight of the homogeneous cerium-zirconium mixed oxide, and also covered by this invention, contain in their preferred embodiments 1 to 9 wt. % rare-earth metal oxide based on the total weight of the homogeneous cerium-zirconium mixed oxide. In that case the rare-earth oxide comprises an oxide of a metal selected from the group consisting of scandium, yttrium, lanthanum, praseodymium, neodymium, samarium, europium and gadolinium or mixtures thereof.

The cerium-zirconium mixed oxide that is contained in the catalyst according to the invention, and was activated by the introduction of sulphur and/or transition metal, contains 0.01 to 5 wt. %, preferably 0.02 to 3 wt. % sulphur and/or 2 to 20 wt. %, preferably 5 to 15 wt. % chromium, molybdenum, tungsten or mixtures thereof, especially preferably molybdenum and/or tungsten. The amounts stated are in each case based on the total weight of the activated cerium-zirconium mixed oxide. Especially preferred embodiments additionally contain 0.1 to 10 wt. %, preferably 0.5 to 5 wt. % of a transition metal selected from the group consisting of manganese, iron, cobalt, nickel, copper, ruthenium, rhodium, palladium, silver, iridium, platinum, gold or mixtures thereof, especially preferably 0.3 to 3 wt. % iron or copper, which acts as a promoter.

Said catalyst provides a cost-effective and vanadium-free alternative to zeolite-based SCR catalysts, and the catalysts according to the invention are characterized by very good SCR activity for the requirements of appropriate ageing stability under hydrothermal conditions.

The following examples, comparative examples and diagrams give a more detailed explanation of the invention.

DETAILED DESCRIPTION OF INVENTION

Figure 1:
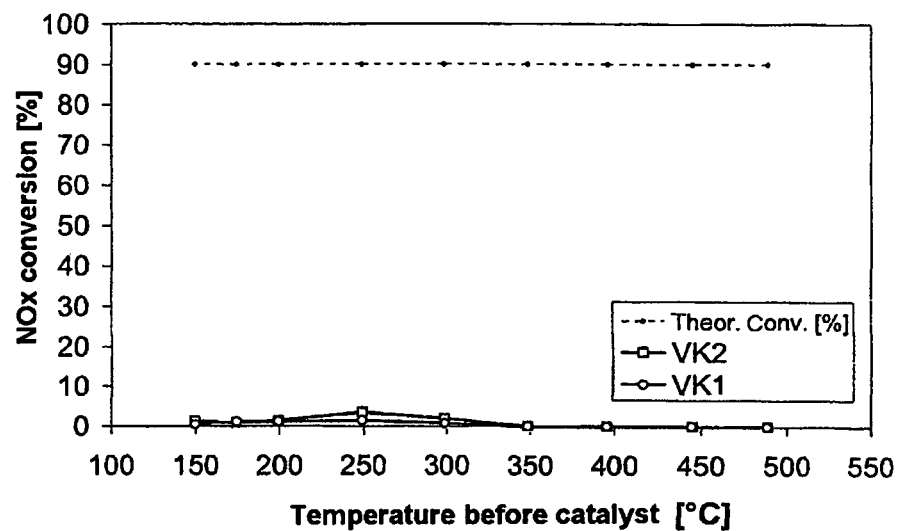
FIG. 1: Nitrogen oxide conversion of untreated, unactivated homogeneous cerium-zirconium mixed oxides containing 86 wt. % cerium oxide (VK1) or 48 wt. % cerium oxide (VK2), based on the total weight of the homogeneous cerium-zirconium mixed oxide.

Investigation of Nitrogen Oxide Conversion as a Measure for SCR Activity

All the cerium-zirconium mixed oxides prepared in the examples described below were suspended in water, ground and applied to a ceramic honeycomb element with a volume of 0.5 L and number of cells of 62 cells per square centimeter with a wall thickness of 0.17 mm. After calcination of the honeycomb element in air at 500° C. for two hours, cylindrical core samples were taken from the coated honeycomb element for testing in a model-gas system with a diameter of 25.4 mm and a length of 76.2 mm.

Testing was carried out in a laboratory model-gas system in the following conditions.

| Composition of the model gas | |
|---|---|
| NO [vol.-ppm]: | 500 |
| NH$_3$ [vol.-ppm]: | 450 |
| O$_2$ [vol. %]: | 5 |
| H$_2$O [vol. %] | 1.3 |
| N$_2$: | remainder |
| General test conditions | |
| Space velocity [h$^{-1}$]: | 30 000 |
| Temperature [° C.]: | 500; 450; 400; 350; 300; 250; 200; 175; 150 |
| Conditioning before the start of measurement: | Model-gas atmosphere; 600° C.; a few minutes |

During the measurement, the nitrogen oxide concentrations of the model exhaust gas after the catalyst were determined using suitable analysis. The nitrogen oxide conversion on the catalyst was calculated for each temperature measurement point from the known, metered nitrogen oxide contents, which were verified by pre-catalyst exhaust gas analysis during the conditioning at the start of each test run, and the measured nitrogen oxide contents after the catalyst, as follows:

$$U_{NO_x}[\%] = 1 - \frac{c_{outlet}(NO_x)}{c_{inlet}(NO_x)} \cdot 100$$

with $$c_{inlet/outlet}(NOx) = c_{in/out}(NO) + c_{in/out}(NO_2) + c_{in/out}(N_2O) \ldots$$

To assess SCR activity of the test materials, the nitrogen oxide conversion values $U_{NO_x}$ [%] obtained were plotted as a function of the temperature measured before the catalyst.

Comparative Example 1

A homogeneous cerium-zirconium mixed oxide, containing 86 wt. % cerium oxide and 4 wt. % lanthanum oxide based on its total weight, was suspended in water, ground and applied to a ceramic honeycomb element with a volume of 0.5 L and number of cells of 62 cells per square centimeter with a wall thickness of 0.17 mm. After calcination of the honeycomb element in air at 500° C. for two hours, a core sample VK1 was taken from the comparative catalyst thus prepared, for testing in the model-gas system, and its nitrogen oxide conversion was investigated.

Comparative Example 2

A homogeneous cerium-zirconium mixed oxide, containing 48 wt. % cerium oxide based on its total weight, was suspended in water, ground and applied to a ceramic honeycomb element with a volume of 0.5 L and number of cells of 62 cells per square centimeter with a wall thickness of 0.17 mm. After calcination of the honeycomb element in air at 500° C. for two hours, a core sample VK2 was taken from the comparative catalyst thus prepared, for testing in the model-gas system, and its nitrogen oxide conversion was investigated.

FIG. 1 shows the result of the model-gas investigation of the unactivated homogeneous cerium-zirconium mixed oxides as VK1 (○) and VK2 (□). As expected, both materials show no significant nitrogen oxide conversion in the SCR reaction with ammonia. The conversion of 3.4% observed for VK2 at 250° C. is within the stated variation of the method of measurement.

Comparative Example 3

As a reference to the state of the art, a commercial SCR catalyst based on an iron-exchanged zeolite, applied to a honeycomb element with a volume of 0.5 L and number of cells of 62 cells per square centimeter with a wall thickness of 0.17 mm, was prepared as a comparative catalyst. A core sample VK3 was taken from this comparative catalyst for testing in the model-gas system, and its nitrogen oxide conversion was investigated in the freshly prepared state.

Another core sample that was taken from the comparative catalyst, and is designated VK3' in the following, was submitted to artificial ageing at 650° C. for 48 hours. Ageing was carried out in a stove under hydrothermal conditions in an atmosphere consisting of 10 vol. % O$_2$ and 10 vol. % oxygen in air.

Comparative Example 4

As another point of reference to the state of the art, a commercial SCR catalyst based on $V_2O_5/TiO_2/WO_3$ was prepared, comprising a coating on a honeycomb element with a volume of 0.5 L and number of cells of 62 cells per square centimeter with a wall thickness of 0.17 mm. A core sample VK4 was taken from the comparative catalyst for testing in the model-gas system, and its nitrogen oxide conversion was investigated in the freshly prepared state.

As in Comparative Example 3, another core sample was taken from the comparative catalyst and was exposed at 650° C. for 48 h to an atmosphere consisting of 10 vol. % $O_2$ and 10 vol. % oxygen in air. This core sample is designated VK4' in the following.

Comparative Example 5

Based on the work by Apostolescu et al. in Appl. Catal. B: Environmental 62 (2006) 104, another comparative catalyst was prepared, with a coating comprising 1.4 wt. % iron and 7 wt. % tungsten on a zirconium-oxide support (cerium oxide-free). As in the other Comparative Examples and Examples, a ceramic honeycomb element with a volume of 0.5 L and number of cells of 62 cells per square centimeter with a wall thickness of 0.17 mm was used as support for the coating. A core sample VK5 was taken from the comparative catalyst for testing in the model-gas system, and its nitrogen oxide conversion was investigated in the freshly prepared state.

As in Comparative Example 4, another core sample was taken from the comparative catalyst and was exposed at 650° C. for 48 h to an atmosphere consisting of 10 vol. % $O_2$ and 10 vol. % oxygen in air. This core sample is designated VK5' in the following.

Comparative Example 6

EP 1 736 232 A1 discloses two different methods of production for SCR catalysts comprising the components tungsten oxide, cerium oxide and zirconium oxide. Paragraph [0007] of that specification describes a catalyst that is very suitable for the selective catalytic reduction of nitrogen oxides with urea, which was stated to be obtained by adding cerium to a tungsten oxide-zirconium oxide.

In this comparative example, a comparative catalyst was prepared according to the information given in that specification, with the proportions of the components used being selected so that the composition of the resultant comparative catalyst roughly corresponded to that of the catalyst according to the invention described in Example 3. Thus, 420 g of a $ZrO_2/WO_3$ mixture (containing 88 wt. % $ZrO_2$ and 12 wt. % $WO_3$, based on the total weight of the mixture used) was suspended in water. While stirring continuously, a cerium nitrate solution containing 202 g cerium was added to the suspension.

A honeycomb element with a volume of 0.5 L and number of cells of 62 cells per square centimeter with a cell wall thickness of 0.17 mm was coated with the suspension thus obtained. After drying and calcination, two core samples were taken from the honeycomb element. For one of the core samples (VK6), the nitrogen oxide conversion of the catalyst in the freshly prepared state was determined in the model-gas system.

The second core sample (VK6') was submitted to artificial ageing at 650° C. for a period of 48 hours in an atmosphere consisting of 10 vol. % oxygen and 10 vol. % water vapour in air, and was only used for determination of the nitrogen oxide conversion in the model-gas system after this treatment.

Comparative Example 7

This comparative catalyst was prepared according to the second method of preparation of SCR catalysts comprising tungsten oxide, cerium oxide and zirconium oxide disclosed in EP 1 736 232 A1. As described in Example 3 of that specification, first a cerium-zirconium mixed compound was precipitated from aqueous solution, and it was then impregnated with a tungsten-containing solution.

For this, an aqueous solution containing 500 g zirconyl nitrate and 200 g cerium(III) nitrate (containing water of crystallization) was neutralized with ammonia solution, so that a cerium/zirconium oxide-hydroxide species was precipitated. A solution of 60 g ammonium metatungstate in water was added to the suspension obtained, stirring continuously.

A honeycomb element with a volume of 0.5 L and number of cells of 62 cells per square centimeter with a cell wall thickness of 0.17 mm was coated with the suspension thus obtained. After drying and calcination, two core samples were taken from the honeycomb element. The nitrogen oxide conversion of the catalyst in the freshly prepared state was determined on one of the core samples (VK7) in the model-gas system.

The second core sample (VK7') was submitted to artificial ageing at 650° C. for a period of 48 hours in an atmosphere consisting of 10 vol. % oxygen and 10 vol. % water vapour in air, and was used for determination of the nitrogen oxide conversion in the model-gas system only after this treatment.

Example 1

A core sample was taken from the catalyst from Comparative Example 1 and was sulphurized in a stove for a period of 48 hours at a temperature of 350° C. in an atmosphere of 10 vol. % oxygen, 10 vol. % water and 20 vol.-ppm sulphur dioxide in nitrogen. The resultant catalyst according to the invention K1 was investigated in the model gas.

Figure 2:
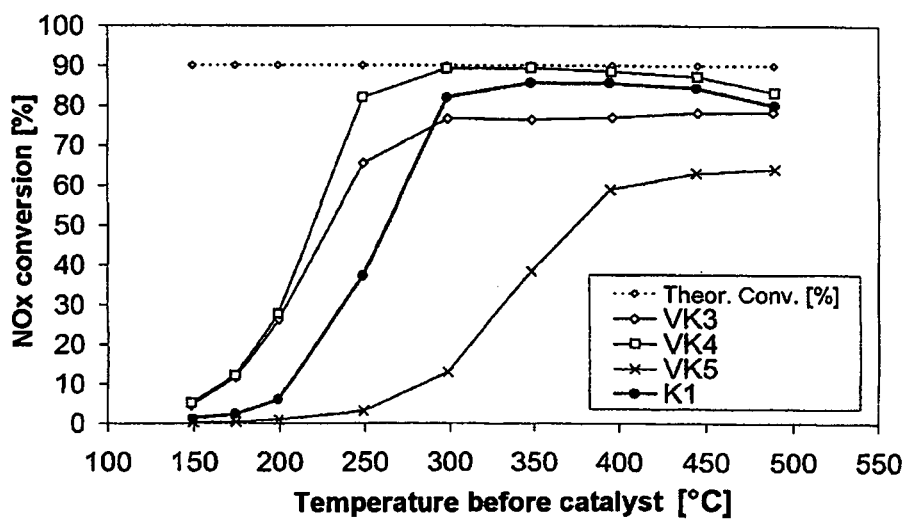
FIG. 2: Nitrogen oxide conversion of a catalyst according to the invention (K1), which contains a cerium-rich cerium-zirconium mixed oxide activated for the SCR reaction by the introduction of sulphur (86 wt. % cerium oxide based on the total weight of the homogeneous cerium-zirconium mixed oxide), compared with the SCR activity of existing SCR catalysts (VK3: zeolite-based; VK4: vanadium-based; VK5: Fe/W/$ZrO_2$)

FIG. 2 shows the nitrogen oxide conversion of the catalyst according to the invention K1 (●) in comparison with the nitrogen oxide conversions of the comparative catalysts VK3 (◊; Fe-zeolite-based), VK4 (□; vanadium-containing) and VK5 (x, Fe/W/$ZrO_2$) prepared according to the state of the art. The catalyst according to the invention K1 shows, over the entire temperature range, better nitrogen oxide conversions in the SCR reaction than the comparative catalyst according to the state of the art VK5, which is also zeolite-free and vanadium-free. Moreover, surprisingly, in the temperature range between 300° C. and 500° C. the nitrogen oxide conversion performance of VK3, a commercially available, Fe-zeolite-based catalyst, is exceeded and the conversion performance of the vanadium-based comparative catalyst VK4 is almost reached.

Example 2

A core sample was taken from the catalyst from Comparative Example 2 and was sulphurized in a stove for a period of 48 hours at a temperature of 350° C. in an atmosphere of 10 vol. % oxygen, 10 vol. % water and 20 vol.-ppm sulphur dioxide in nitrogen. The resultant catalyst according to the invention K2 was investigated in the model gas.

Figure 3:
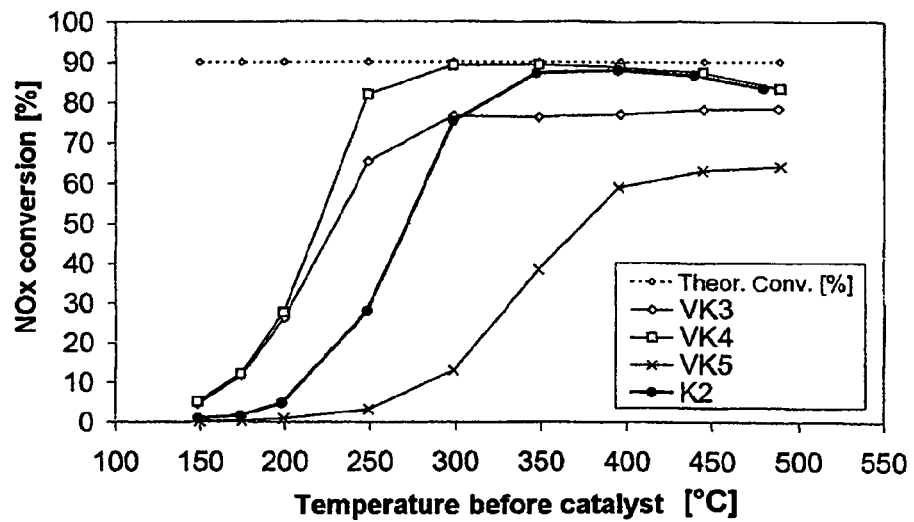
FIG. 3: Nitrogen oxide conversion of a catalyst according to the invention (K2), which contains a cerium-zirconium mixed oxide activated for the SCR reaction by the introduction of sulphur (contains 48 wt. % cerium oxide based on the total weight of the homogeneous cerium-zirconium mixed oxide), compared with the SCR activity of existing SCR catalysts (VK3: zeolite-based; VK4: vanadium-based; VK5: Fe/W/$ZrO_2$)

FIG. 3 shows the result of the investigation, also in comparison with the existing SCR catalysts VK3 (◊; Fe-zeolitebased), VK4 (□; vanadium-containing) and VK5 (x, Fe/W/ZrO₂). The catalyst according to the invention K2 also exceeds the conversion performance of VK5 over the entire temperature range and the conversion performance of the Fe-zeolite-based catalyst VK3 at temperatures above 300° C. The nitrogen oxide conversion performance of the vanadium-based comparative catalyst VK4 is reached completely starting from 350° C.

Example 3

A homogeneous cerium-zirconium mixed oxide with a cerium oxide content of 48 wt. %, based on its total amount, was activated for the SCR reaction by the introduction of tungsten. For this, first the amount of water that can be taken up by the homogeneous cerium-zirconium mixed oxide, without the material losing its free-flowing properties, was determined. The proportion of a tungsten compound with good water-solubility that corresponded to 10 wt. % tungsten based on the total weight of the activated cerium-zirconium-oxide that was to be prepared, was dissolved in the corresponding amount of water. The homogeneous cerium-zirconium oxide was impregnated with the tungsten-containing solution thus prepared until the pores were filled, and then, for thermal fixation of the tungsten, was stored in air in the stove at 500° C. for 2 hours.

The activated cerium-zirconium mixed oxide thus obtained was suspended in water, ground and applied to a ceramic honeycomb element with a volume of 0.5 L and number of cells of 62 cells per square centimeter with a wall thickness of 0.17 mm. After calcination of the honeycomb element in air at 500° C. for two hours, a core sample K3 was taken from the catalyst according to the invention thus prepared, for testing in the model-gas system, and its nitrogen oxide conversion was investigated.

Figure 4:
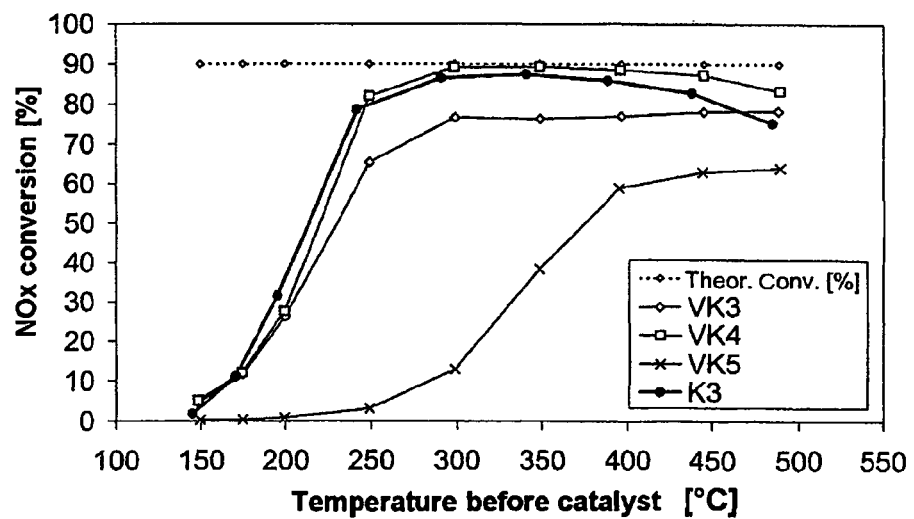
FIG. 4: Nitrogen oxide conversion of a catalyst according to the invention (K3), which contains a homogeneous cerium-zirconium mixed oxide activated for the SCR reaction by the introduction of tungsten, compared with the SCR activity of existing SCR catalysts (VK3: zeolite-based; VK4: vanadium-based; VK5: Fe/W/$ZrO_2$)

FIG. 4 shows the result of the investigation of K3 in the model gas in comparison with the nitrogen oxide conversion performance of the existing SCR catalysts VK3 (◇; Fe-zeolite-based), VK4 (□; vanadium-containing) and VK5 (x, Fe/W/ZrO₂). K3 shows, over the entire temperature range, a conversion performance that largely corresponds to that of the vanadium-based catalyst VK4, which has the highest performance of the selected comparative catalysts. Slight losses of activity, relative to the vanadium-based and the zeolite-based comparative catalyst, are only observed for the high-temperature measurement point at 500° C.

Figure 8:
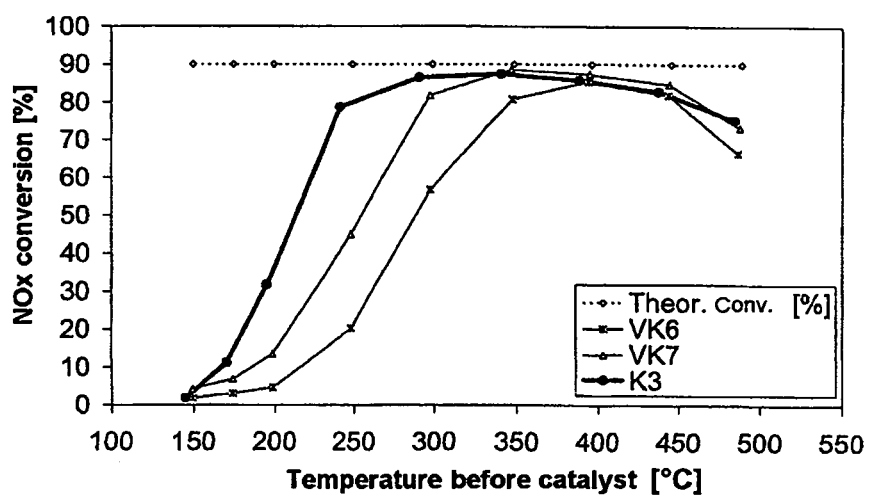
FIG. 8: Nitrogen oxide conversion of a catalyst according to the invention in the freshly prepared state (K3), which contains a homogeneous cerium-zirconium mixed oxide (48 wt. % cerium oxide based on the total weight of the homogeneous cerium-zirconium mixed oxide) activated for the SCR reaction by the introduction of tungsten, in comparison with existing SCR catalysts that contain tungsten oxide, cerium oxide and zirconium oxide (VK6: Ce{ZrO$_2$—WO$_3$}; VK7: W{CeO$_2$—ZrO$_2$})

FIG. 8 shows the nitrogen oxide conversion of the freshly prepared catalyst K3 in comparison with the two comparative catalysts VK6 (*) and VK7 (Δ), which are also only composed of cerium oxide, zirconium oxide and tungsten oxide, but do not contain a defined, homogeneous cerium/zirconium mixed oxide, but at best, as in the case of VK7, an inhomogeneous mixed species. The catalyst according to the invention shows far better SCR activity in the temperature range below 300° C.

The decisive advantages of the catalyst according to the invention relative to these catalysts according to the state of the art are especially pronounced after hydrothermal ageing.

Figure 9:
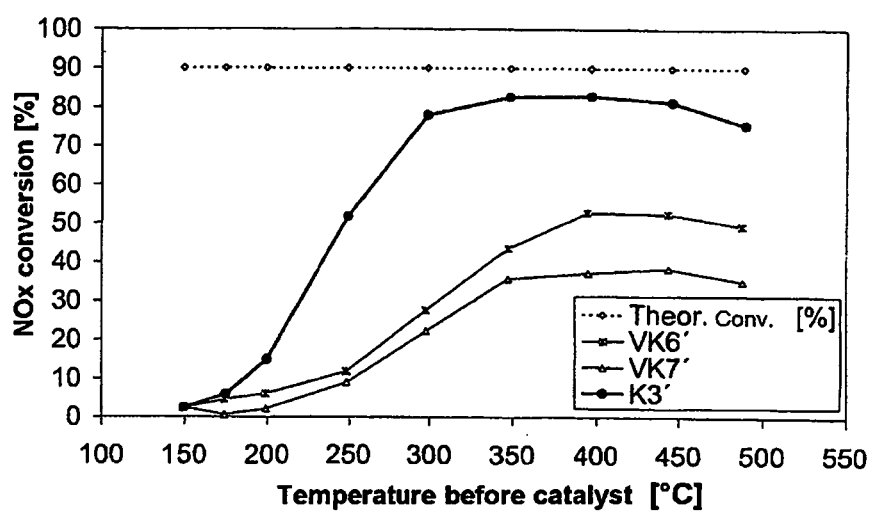
FIG. 9: Nitrogen oxide conversion of a catalyst according to the invention after hydrothermal artificial ageing (K3'), which contains a homogeneous cerium-zirconium mixed oxide (48 wt. % cerium oxide based on the total weight of the homogeneous cerium-zirconium mixed oxide) activated for the SCR reaction by the introduction of tungsten, in comparison with existing SCR catalysts that contain tungsten oxide, cerium oxide and zirconium oxide (VK6: Ce{ZrO$_2$—WO$_3$}; VK7: W{CeO$_2$—ZrO$_2$})

A second core sample (K3') was exposed at 650° C. for 48 hours to an atmosphere containing 10 vol. % oxygen and 10 vol. % water vapour in air. After this treatment, the nitrogen oxide conversion on this catalyst was investigated in the model-gas system and the result was compared with the nitrogen oxide conversions of the similarly aged comparative catalysts VK6' (*) and VK7' (Δ). As can be seen from the data shown in FIG. 9, the catalytic performance of the catalysts according to the state of the art drops dramatically as a result of hydrothermal ageing. Conversions of 50% nitrogen oxide conversion are no longer exceeded even at temperatures above 350° C. In contrast, even after ageing, the catalyst according to the invention K3' still shows nitrogen oxide conversions of approx. 80% in the temperature range above 300° C.

Example 4

A homogeneous cerium-zirconium mixed oxide with a cerium oxide content of 86 wt. % and a lanthanum oxide content of 4 wt. %, based on its total amount, was activated for the SCR reaction by the introduction of iron and tungsten. For this, first the amount of water that can be taken up by the homogeneous cerium-zirconium mixed oxide without the material losing its free-flowing properties, was determined. The proportion of an iron(III) compound with good water-solubility that corresponded to 1.3 wt. % iron, and the proportion of a tungsten compound of good solubility that corresponded to 10 wt. % tungsten, were dissolved in the corresponding amount of water. (The figures for the contents were based on the total weight of the activated cerium-zirconium mixed oxide that was to be prepared.) The homogeneous cerium-zirconium oxide was impregnated with the iron-containing and tungsten-containing solution until the pores were filled, and then, for thermal fixation of the transition metals, was stored in air in the stove at 500° C. for 2 hours.

The activated cerium-zirconium mixed oxide thus obtained was suspended in water, ground and applied to a ceramic honeycomb element with a volume of 0.5 L and number of cells of 62 cells per square centimeter with a wall thickness of 0.17 mm. After calcination of the honeycomb element in air at 500° C. for two hours, a core sample K4 was taken from the catalyst according to the invention thus prepared, for testing in the model-gas system, and its nitrogen oxide conversion was investigated.

Figure 5:
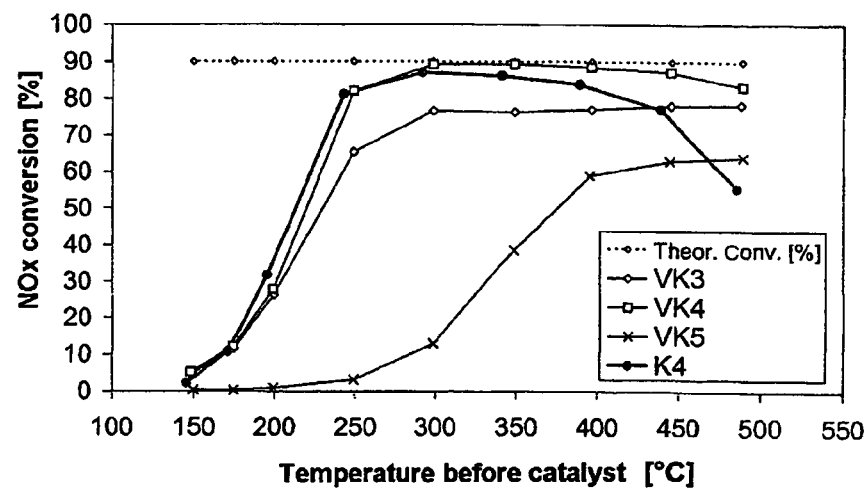
FIG. 5: Nitrogen oxide conversion of a catalyst according to the invention (K4), which contains a homogeneous cerium-zirconium mixed oxide activated for the SCR reaction by the introduction of iron and tungsten, compared with the SCR activity of existing SCR catalysts (VK3: zeolite-based; VK4: vanadium-based; VK5: Fe/W/$ZrO_2$)

FIG. 5 shows the result of the investigation of K4 in the model gas in comparison with the nitrogen oxide conversion performance of the existing SCR catalysts VK3 (◇; Fe-zeolite-based), VK4 (□; vanadium-containing) and VK5 (x, Fe/W/ZrO₂). In the temperature range 150 to 400° C., K4 displays nitrogen oxide conversion performance roughly corresponding to that of the commercial vanadium-containing catalyst VK4 and well above that of the vanadium-free comparative catalysts VK3 and VK5. The decline in nitrogen oxide conversion above 450° C. results from a loss of selectivity, due to the overoxidation of ammonia that occurs at high temperatures.

Example 5

According to the procedure described in Example 4, another activated cerium-zirconium mixed oxide and another catalyst according to the invention were prepared, using, as raw material, a homogeneous cerium-zirconium mixed oxide that contained 48 wt. % cerium oxide based on the total weight of the homogeneous cerium-zirconium mixed oxide. Two core samples with a diameter of 25.4 mm and a length of 76.2 mm were taken from the catalyst obtained. One of the core samples (K5) was submitted, in the freshly prepared state, to investigation of SCR activity.

The second core sample (K5') was first aged at 650° C. for 48 hours in an atmosphere consisting of 10 vol. % O₂ and 10 vol. % oxygen in air. Then the nitrogen oxide conversion of this core sample was also investigated in the model gas.

Figure 6:
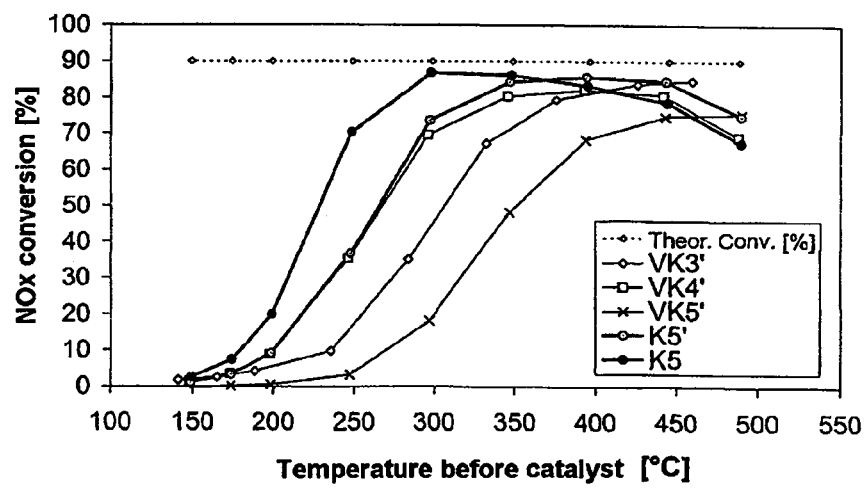
FIG. 6: Nitrogen oxide conversion of a catalyst according to the invention, which contains a homogeneous cerium-zirconium mixed oxide activated for the SCR reaction by the introduction of iron and tungsten, in the freshly prepared state (K5) and after hydrothermal artificial ageing (K5'), compared with the SCR activity of existing SCR catalysts after hydrothermal ageing (VK3': zeolite-based; VK4': vanadium-based; VK5': Fe/W/ZrO$_2$)

FIG. 6 shows the result of determinations of the nitrogen oxide conversions of K5 (freshly prepared) and K5' (hydrothermally aged) in comparison with the similarly hydrothermally aged comparative catalysts VK3' (◇; Fe-zeolite-based), VK4' (□; vanadium-containing) and VK5' (x, Fe/W/ZrO$_2$). It is clear that the catalyst according to the invention K5, in the fresh state, displays excellent nitrogen oxide conversion performance especially in the temperature range 150 to 400° C. The decline in nitrogen oxide conversion starting from 450° C. results—as with K4—from the overoxidation of ammonia.

Comparison of the performance of the hydrothermally aged core sample K5' with the conversion performance of the hydrothermally aged commercial catalysts also provides evidence of excellent ageing resistance of the catalyst according to the invention.

Example 6

Another core sample was taken from the catalyst prepared in Example 5 and was sulphurized in a stove at 350° C. for a period of 48 hours in an atmosphere of 10 vol. % oxygen and 20 vol.-ppm sulphur dioxide in nitrogen. The resultant catalyst according to the invention K6, which contains cerium-zirconium mixed oxide activated by the introduction of tungsten, iron and sulphur, was investigated in the model gas.

Figure 7:
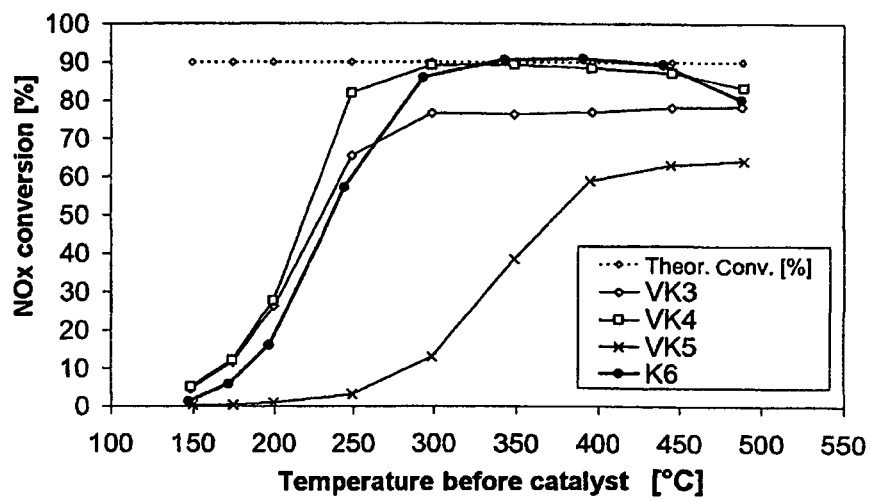
FIG. 7: Nitrogen oxide conversion of a catalyst according to the invention (K6), which contains a homogeneous cerium-zirconium mixed oxide activated for the SCR reaction by the introduction of iron, tungsten and sulphur, compared with the SCR activity of existing SCR catalysts (VK3: zeolite-based; VK4: vanadium-based; VK5: Fe/W/ZrO$_2$)

FIG. 7 shows the result of the activity tests in comparison with the existing SCR catalysts VK3 (◇; Fe-zeolite-based), VK4 (□; vanadium-containing) and VK5 (x, Fe/W/ZrO$_2$). K6 shows excellent nitrogen oxide conversion performance in the temperature range between 300 and 450° C. The nitrogen oxide conversions in the low-temperature range are completely comparable with those of the zeolite-based comparative catalyst VK3. K6 is another example of a catalyst according to the invention that is characterized by excellent conversion performance in the SCR reaction with ammonia.

All the examples show that by deliberate introduction of sulphur and/or transition metal in a homogeneous cerium-zirconium mixed oxide, extremely effective activation of the material for the SCR reaction of nitrogen oxides with ammonia takes place and the correspondingly prepared catalysts are suitable as an alternative to the existing zeolite- and/or vanadium-based standard technologies.

The invention claimed is:

1. A vanadium-free catalyst for selective catalytic reduction of nitrogen oxides with ammonia or a compound that decomposes to ammonia as reducing agent, comprising a catalytically active coating on an inert support,
   the catalytically active coating comprises a completely or partially homogeneous cerium-zirconium mixed oxide, which contains 10 to 90 wt. % of cerium oxide based on the total weight of the homogeneous cerium-zirconium mixed oxide and which is activated for the SCR reaction by the introduction of a transition metal selected from the group consisting of chromium, molybdenum, tungsten and mixtures thereof, and
   whereby the vanadium-free catalyst is made by the process of impregnating the homogeneous cerium-zirconium mixed oxide with an amount of an aqueous solution of a compound of chromium, molybdenum, tungsten, or a mixture thereof, the amount of the aqueous solution being selected such that the homogeneous cerium-zirconium mixed oxide is moistened so that its pores are filled, without loss of its free-flowing properties.

2. The vanadium-free catalyst according to claim 1, wherein
   the homogeneous cerium-zirconium mixed oxide is doped with 1 to 9 wt. % of a rare-earth metal oxide based on the total weight of the homogeneous cerium-zirconium mixed oxide.

3. The vanadium-free catalyst according to claim 2, wherein
   the rare-earth metal oxide is an oxide of a metal selected from the group consisting of scandium, yttrium, lanthanum, praseodymium, neodymium, samarium, europium, gadolinium and mixtures thereof.

4. The vanadium-free catalyst according to claim 1, wherein
   the homogeneous cerium-zirconium mixed oxide which is activated contains 2 to 20 wt. % of a transition metal selected from the group consisting of chromium, molybdenum, tungsten and mixtures thereof.

5. The vanadium-free catalyst according to claim 4, wherein
   the homogeneous cerium-zirconium mixed oxide which is activated additionally contains 0.1 to 10 wt. % of a transition metal selected from the group consisting of manganese, iron, cobalt, nickel, copper, ruthenium, rhodium, palladium, silver, iridium, platinum, gold and mixtures thereof.

6. The vanadium-free catalyst according to claim 4, wherein
   the homogeneous cerium-zirconium mixed oxide which is activated contains 0.01 to 5 wt. % of sulphur.

7. The vanadium-free catalyst according to claim 1, wherein
   the support consists of ceramic or metal.

8. The vanadium-free catalyst according to claim 7, wherein
   a ceramic flow-through honeycomb monolith or a ceramic wall-flow filter substrate is used as the support.

9. The vanadium-free catalyst according to claim 1, wherein
   after hydrothermal aging, the vanadium-free catalyst exhibits nitrogen oxide conversions of about 80% in the temperature range above 300° C.

10. A vanadium-free catalyst for selective catalytic reduction of nitrogen oxides with ammonia or a compound that decomposes to ammonia as a reducing agent, said vanadium-free catalyst comprises a catalytically active coating on an inert support and is hydrothermally aged and exhibits nitrogen oxide conversions of about 80% in the temperature range above 300° C.,
    wherein the catalytically active coating comprises a completely or partially homogeneous cerium-zirconium mixed oxide, which contains 10 to 90 wt. % of cerium oxide based on the total weight of the homogeneous cerium-zirconium mixed oxide and which is activated for the SCR reaction by the introduction of a transition metal selected from the group consisting of chromium, molybdenum, tungsten and mixtures thereof;
    wherein the vanadium-free catalyst is made by the process of impregnating the homogeneous cerium-zirconium mixed oxide with an amount of an aqueous solution of a compound of chromium, molybdenum, tungsten, or a mixture thereof, the amount of the aqueous solution being selected such that the homogeneous cerium-zirconium mixed oxide is moistened so that its pores are filled, without loss of its free-flowing properties.

11. A process for the selective catalytic reduction of nitrogen oxides with ammonia or a compound that decomposes to ammonia as reducing agent which comprises carrying out the reduction in the presence of the catalyst of claim 1.

12. A process for the removal of nitrogen oxides from exhaust gases of primarily lean-burn internal combustion engines in motor vehicles which comprises passing the exhaust gases in contact with the catalyst of claim 1.

13. A method of improving the SCR activity of a catalyst that contains a homogeneous cerium-zirconium mixed oxide which comprises activating the homogeneous cerium-zirconium mixed oxide, which contains 10 to 90 wt. % of cerium oxide based on the total weight of the homogeneous cerium-zirconium mixed oxide by impregnating the homogeneous cerium-zirconium mixed oxide with an amount of aqueous solution of a compound of chromium, molybdenum, tungsten or mixtures thereof, the amount of aqueous solution being selected such that the homogeneous cerium-zirconium mixed oxide is moistened so that its pores are filled, without loss of its free-flowing properties, wherein after hydrothermal aging, the catalyst exhibits nitrogen oxide conversions of about 80% in the temperature range above 300° C.

14. The method according to claim 13, wherein a homogeneous cerium-zirconium mixed oxide, which additionally contains 1 to 9 wt. % of a rare-earth metal oxide based on the total weight of the homogeneous cerium-zirconium mixed oxide is used.

15. The method according to claim 13, wherein a homogeneous cerium-zirconium mixed oxide which additionally contains sulphur is used.

16. The method according to claim 14, wherein a homogeneous cerium-zirconium mixed oxide which additionally contains sulphur is used.

* * * * *